US008186489B2

(12) United States Patent
Zimmer et al.

(10) Patent No.: US 8,186,489 B2

(45) Date of Patent: May 29, 2012

(54) PULL ARRANGEMENT WITH REVERSING TENSION SPRING

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 459 days.

(21) Appl. No.: 12/583,185

(22) Filed: Aug. 14, 2009

(65) Prior Publication Data

US 2010/0007254 A1 Jan. 14, 2010

Related U.S. Application Data

(63) Continuation-in-part of application No. PCT/DE2008/000256, filed on Feb. 13, 2008.

(30) Foreign Application Priority Data

Feb. 16, 2007 (DE) ......................... 10 2007 008 363

(51) Int. Cl.
*F16D 69/00* (2006.01)

(52) U.S. Cl. .............. 188/265; 188/322.16; 188/322.19; 188/290; 267/73; 267/74; 267/155; 267/175; 267/179; 312/30; 312/319.1; 312/333

(58) Field of Classification Search .................. 188/265, 188/322, 330.1, 334, 319.1, 319.2, 322.16, 188/322.19; 267/73, 74, 180, 179, 166.1; 185/37, 45
See application file for complete search history.

(56) References Cited

U.S. PATENT DOCUMENTS

| | | | | |
|---|---|---|---|---|
| 1,472,936 | A * | 11/1923 | Pitman | 185/39 |
| 6,910,557 | B2 * | 6/2005 | Doornbos et al. | 188/290 |
| 6,953,233 | B2 * | 10/2005 | Lam et al. | 312/333 |
| 2006/0175946 | A1 | 8/2006 | Le | |

FOREIGN PATENT DOCUMENTS

| | | |
|---|---|---|
| DE | 20 2004 005 322 | 4/2005 |
| EP | 1 561 398 | 8/2005 |
| WO | 2005/044046 | 5/2005 |
| WO | WO 2005044046 A1 * | 5/2005 |

* cited by examiner

*Primary Examiner* — Robert A Siconolfi
*Assistant Examiner* — San Aung
(74) *Attorney, Agent, or Firm* — Klaus J. Bach

(57) ABSTRACT

In a pull arrangement including a housing with a guide structure movably supporting a carrier element which has a park position at one end of the guide structure and a rest position at the other end and a reversing structure is provided at the other end of the guide structure and a tension spring extending around the reversing structure is connected with one end to the carrier element and the opposite end to the housing for moving the carrier element to the end position, the tension spring comprises an area of high spring stiffness where it extends around the reversing structure and an area of low spring stiffness where the spring is connected to the housing away from the reversing structure.

9 Claims, 2 Drawing Sheets

PULL ARRANGEMENT WITH REVERSING TENSION SPRING

This is a continuation-in-part application of pending international patent application PCT/DE2008/000256 filed Feb. 13, 2008 and claiming the priority of German patent application 10 2007 003 363.9 filed Feb. 16, 2007.

BACKGROUND OF THE INVENTION

The invention resides in a pull arrangement with a tension spring which extends at least partially around a redirecting pulley, a combined deceleration and acceleration device with such a pull arrangement and a guide system with such a deceleration and acceleration device.

DE 20 2004 006 410 U1 discloses a similar arrangement. However, the spring as provided in this arrangement tends to break with a large number of actuations so that the life of this arrangement is limited.

It is the object of the present invention to provide a pull arrangement, a combined deceleration and acceleration device with such a pull arrangement and also a guide system with a deceleration and acceleration device wherein chances of breakage of the spring are minimized.

SUMMARY OF THE INVENTION

In a pull arrangement including a housing with a guide structure movably supporting a carrier element which has a park position at one end of the guide structure and a rest position at the other end and a reversing structure is provided at the other end of the guide structure and a tension spring extending around the reversing structure is connected with one end to the carrier element and the opposite end to the housing for moving the carrier element to the end position, the tension spring comprises an area of high spring stiffness where it extends around the reversing structure and an area of low spring stiffness where the spring is connected to the housing away from the reversing structure.

The invention will become more readily apparent from the following description thereof on the basis of the accompanying drawings.

DETAILED DESCRIPTION OF THE DEVICE ACCORDING TO THE INVENTION

Figure 1:
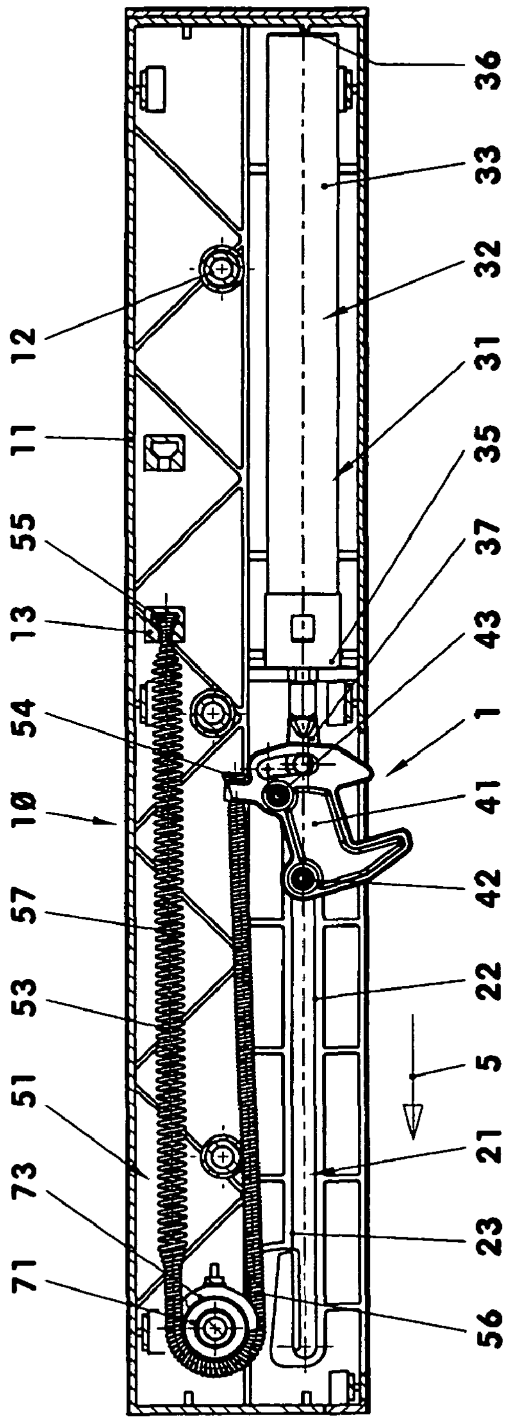
FIG. 1 shows a combined deceleration and acceleration device with a carrier element in a park position.
Figure 2:
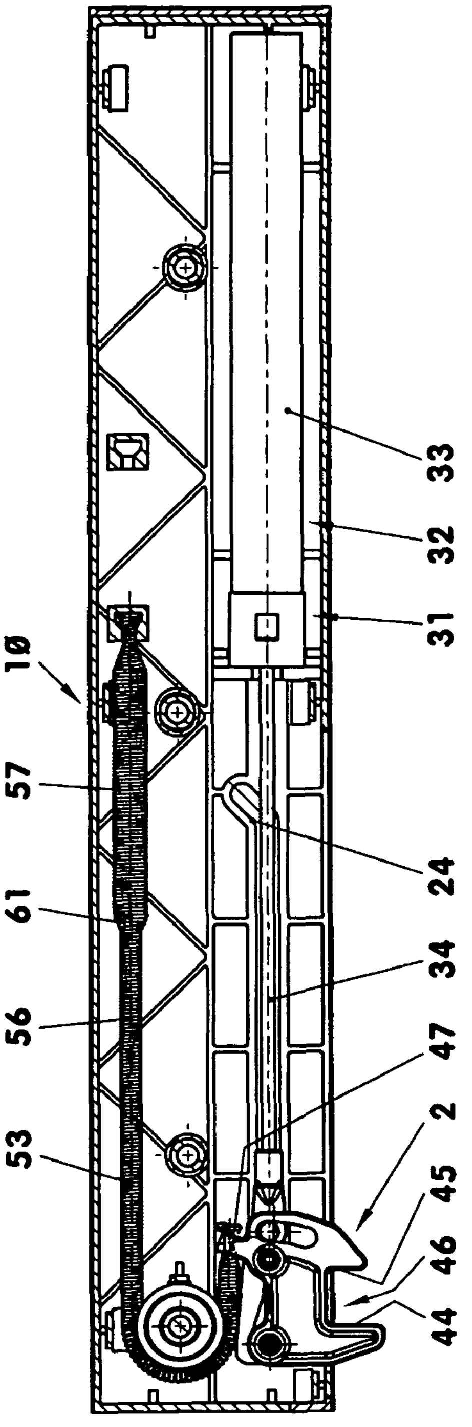
FIG. 2 shows a combined deceleration and acceleration device with the gripper element in a rest position.

FIGS. 1 and 2 show, in a longitudinal cross-sectional view, a combined deceleration and acceleration device 10. The device comprises a gripper element 41 which is shown in FIG. 1 in a park position 1 and in FIG. 2 in a rest position 2.

The combined deceleration and acceleration device 10 is for example part of a guide system for a drawer guide structure of a furniture piece or of a sliding door arrangement. In such guide systems, the combined deceleration and acceleration device 10 is mounted for example to the furniture piece relative to which the drawer is movable. The drawer is then provided with an operating element. For example, during closing of the drawer, in a partial stroke next to the closed end position of the drawer, the operating element comes into contact with the carrier element 41 of the deceleration and acceleration device 10. The operating element then releases the carrier element 41 from the force and/or form-lockingly secured park position 1 and carries it in the closing stroke direction 5 along a guide arrangement 21 to the rest position 2. In this step, the stroke movement of the drawer relative to the furniture piece is decelerated by the deceleration device 31. For example, concurrently with the release of the carrier element 41 from the park position 1, the acceleration device 51 is activated which pulls the drawer against the effect of the deceleration device 31 toward, for example, the rest position in which the drawer is closed. The deceleration and acceleration device 10 remains herein in engagement with the operating element of the drawer up to, and in, the closed position of the drawer. Of course, it is also possible that such a deceleration and acceleration device 10 can be arranged so that it is activated during opening of the drawer before the open end position of the drawer is reached.

It is also possible to mount the operating element to the furniture piece and the deceleration and acceleration device 10 to the drawer.

The deceleration and acceleration device 10 comprises a housing 11, in which the deceleration device 31, the acceleration device 51, the guide arrangement 21 and the carrier element 41 are accommodated.

The housing 11 has for example three through bores 12 via which the housing 11 can be mounted, by means of mounting means for example to the furniture piece.

The deceleration device 31 comprises a cylinder-piston unit 32 of which in FIGS. 1 and 2 only the cylinder 33 and the piston rod 34 are shown. The cylinder piston unit 32 may be pneumatically or hydraulically operated. A displacement chamber is disposed in this exemplary embodiment between the piston and the cylinder head 35, a compensation chamber is delimited by the piston and the cylinder end wall 36.

The stroke of the piston and the piston rod 34 is for example 110 mm. The carrier element 41 is pivotally supported-on the piston rod head 37. The pivot axis of the carrier element 41 extends in the representation of FIGS. 1 and 2 normal to the drawing plane.

The carrier element 41 is guided in the guide arrangement 21 for example by means of two guide bolts 42, 43. The guide arrangement 21 comprises two guide tracks 22 which are arranged in the housing 11 opposite each other but of which in the longitudinal cross-sectional view only one is shown. The carrier element 41 has two engagement shoulders 44, 45, which extend from the housing to different degrees. The engagement shoulder 44 remote from the cylinder 33 extends further than the engagement shoulder 45 which is closer to the cylinder 33. The two engagement shoulders 44, 45 delimit a carrier cavity 46.

The two guide tracks 22 comprise each a straight section 23 and a curved section 24 disposed adjacent thereto in the direction of the cylinder 33. In FIGS. 1 and 2, the curved section 24 is curved upwardly. The center lines of the guide tracks 22 define a plane in which also the center line of the piston rod 54 is disposed.

At its side opposite the engagement opening 46, the carrier element 41 has a spring holder 47, which comprises a U-shaped recess in which one end of a tension spring 53 is accommodated. The other end of the tension spring 53 is supported in a similar spring holder 13 which is mounted in the housing 11—in FIGS. 1 and 2 for example above the cylinder 33. Sliding of the ends of the spring 53 out of the holders is prevented by for example flange-like engagement structures 54, 55 of increased thickness provided on the ends of the spring.

The tension spring 53 shown herein has a nominal length—this is the length between the engagement structures 54, 55 when the spring is relaxed—of for example 199 mm. The overall expansion stroke of the spring is for example 125 mm, which is about 63% of its nominal length. In the representation of FIG. 2, the tension spring 53 is relaxed to a rest stroke of 15 mm; in FIG. 1, it is shown expanded to the full extension length.

The tension strength spring 53 has in this example a constant wire diameter of for example 0.85 mm. It comprises a single piece but includes for example two areas 56, 57 of different coil diameters. A first area 56—this area 56 is disposed adjacent the carrier-end holder for the spring 53—has for example an outer diameter of 3.8 mm. Its length in the relaxed state of the spring is for example 61% of the nominal length of the spring. In this first area 56, the tension spring 53 extends around a redirecting device 71. The redirecting device is in the shown embodiment for example a reversing roller 71 which is rotatably supported in the housing 11. But it may also be stationary. As redirecting device also a diverting structure or diverting roller for example with a diverting angle of 15 or 90° is possible. In all these cases, the spring 53 extends around the diverting or reversing structure 71 at least over some part thereof. The wrap-around angle of the spring 53 around the reversing roller 71 is in the shown FIGS. 1 and 2 maximally 183°.

Figure 3:
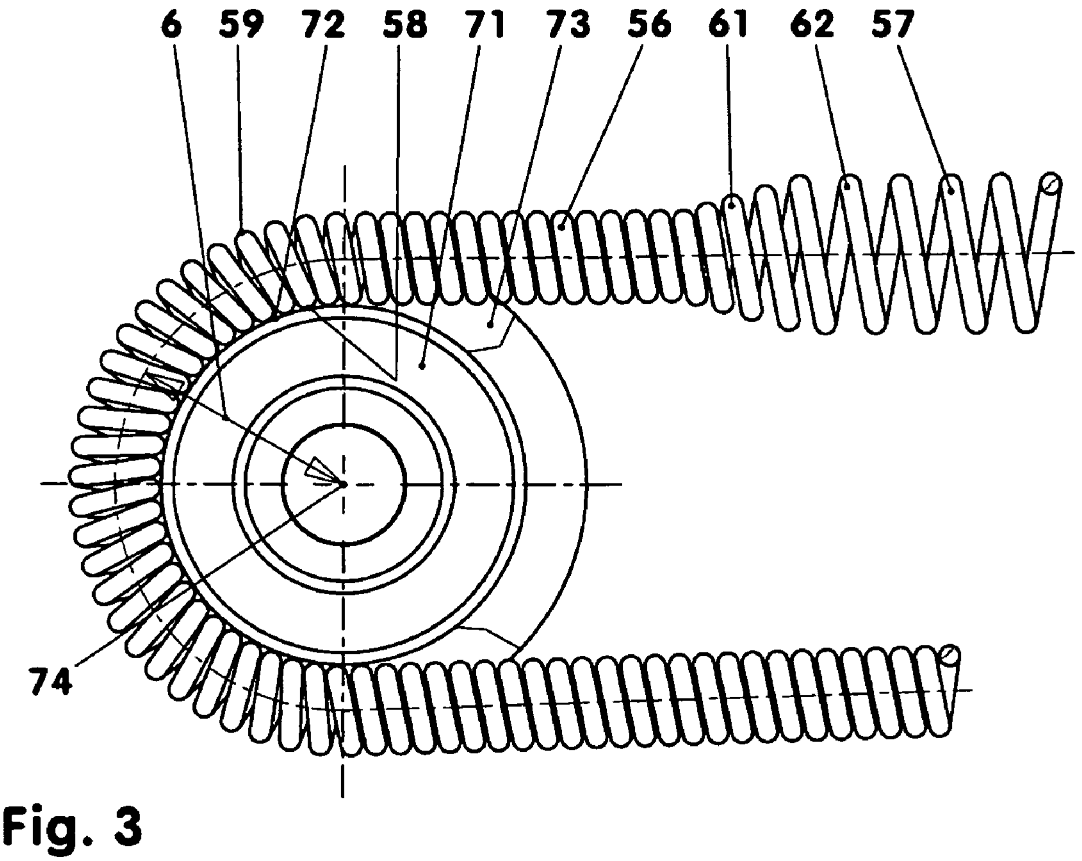
FIG. 3 shows a detail of FIG. 1.
Figure 4:
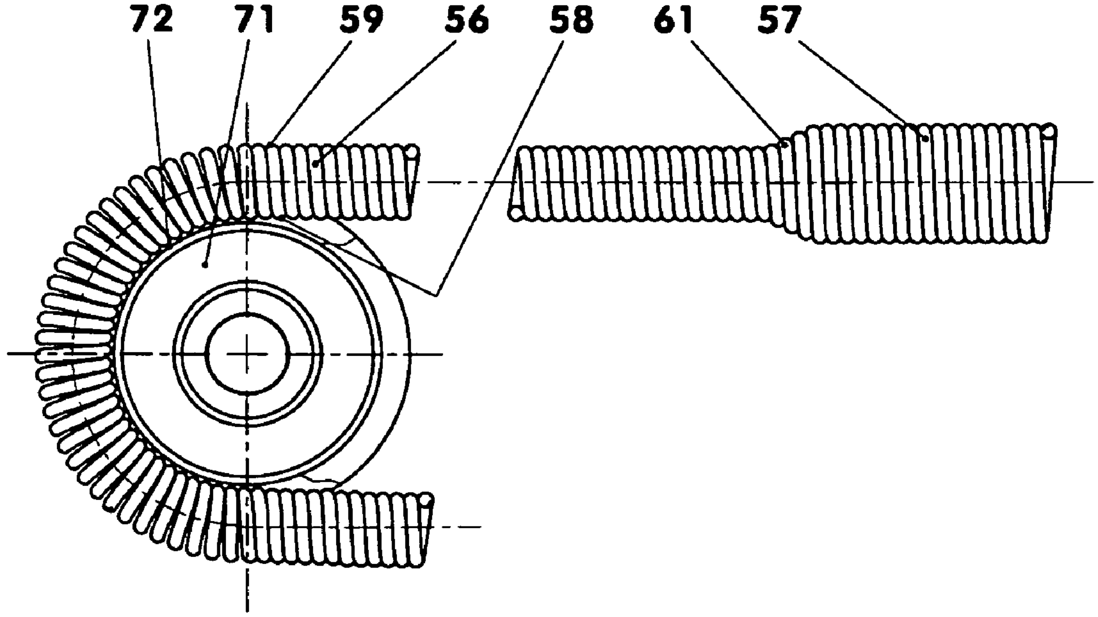
FIG. 4 shows a detail of FIG. 2.

The reversing roller 71, see FIGS. 3 and 4, has for example a support surface 72 which is delimited at opposite sides by guide discs 73. The support surface may include transverse grooves or corrugations. The diameter of the support surface 72 in the given example is 17 mm. The tension spring 53 is with its inner area in contact with the support surface 72; the outer area extends radially outwardly.

The second area 57 of the tension spring 53 has for example an outer diameter of 6.6 mm and is adjacent the first area 56 with a transition area 61 disposed therebetween. The second area 57 forms the connection between the first area 56 and the housing-side holder 13 of the tension spring 53. The length of the relaxed second area 51 is in the shown embodiment about 29% of the nominal length of the spring 53. The first area 56 is consequently more than twice as long as the second area 57. The diameter of the second area 57 is greater than 1.5 times the diameter of the first area 56.

The spring stiffness of the first area 56 is in the shown embodiment 0.17 Newton per millimeter. The spring stiffness of the second area 57 is less than one third of this value for example, 0.05 Newton per millimeter. The inverse value of the over-all stiffness of the tension spring 53 is, with the series arrangement of the two spring areas 56, 57, the sum of the reverse values of spring stiffness of the two spring areas. The tension spring 53 may also include more than two areas of different spring stiffness.

After mounting the combined deceleration and acceleration device 10 into a guide system, with the drawer opened, the carrier element 41 is in the park position as shown in FIG. 1. The piston rod 34 of the cylinder-piston unit 32 is then retracted. With the tension spring 53 tensioned the energy storage device formed thereby is charged.

When the tension spring 53 is tensioned, the first area 56, that is, the area of high spring stiffness, is lengthened for example by 14% of the nominal length of the tension spring 53. The area 57 of low spring stiffness is lengthened for example by 49% of the nominal length of the spring 53. The lengthened area 57 of low spring stiffness is so arranged that it does not come into contact with the reversing roller 71. The stroke of the tension spring can, in this way, be divided into the two partial strokes in such a way that the maximum partial stroke of the area 56 of high spring stiffness does not exceed 30% of the full stroke of the tension spring 53.

When the drawer is being closed, the operating element comes into contact with the engagement shoulder 44 of the carrier element 41 and pulls the carrier element out of its park position 1. The carrier element 41 is then pulled along the guide arrangement 21 from the park position 1 shown in FIG. 1 to the rest position 2 shown in FIG. 2. The piston rod 34 is pulled out of the cylinder 33 in the process. In the deceleration device 31, the piston of the cylinder-piston unit 32 compresses the hydraulic or pneumatic fluid in the displacement chamber. The compressed pneumatic or hydraulic fluid can be throttled into the compensation chamber in the process. If appropriate, in a hydraulic cylinder piston unit 32 additional hydraulic fluid may be supplied to the compensation chamber from an external compensation container. The throttling may for example decrease with the piston stroke. The movement of the carrier element 41 and consequently of the drawer is slowed down.

At the beginning of the stroke movement, the acceleration device 51, that is, the pull arrangement acts on the carrier element 41. The tension spring 53 contracts and pulls the carrier element 41 toward the rest position 2. The energy storage structure 53 is discharged. The carrier element 41, and consequently, the drawer, is pulled against the effect of the deceleration device 31 and is moved slowly for example to its closed end position, where it stops without jerk. The tension spring 53 is now contracted to a residual stroke, see FIG. 2. The area 56 of the tension spring of high stiffness is then expanded only for example by 1.5% of the nominal length, the area of low spring stiffness is expanded by 6% of the nominal length.

During contraction the tension spring 53 moves along the support surface 72 of the reversing roller 71 whereby the reversing roller 72 is rotated for example in clockwise direction. The windings 62 of the tension spring 53 approach one another. The inner areas 58 and the outer areas 59 of the tension spring 53, see FIGS. 3, 4 are displaced relative to each other. As long as the windings do not obstruct one another, the neutral line of the contraction is disposed on the geometric center line of the tension spring 53. The radius of this neutral line relative to the axis of rotation of the reversing roller 71 will be designated below as medium reversing radius 6. With a stationary reversing or reduction device, the radius center point is the center point of the support surface.

During reversal of the tension spring 53, the load caused by the tension force as well as an additional load caused by the displacement of the inner areas 58 and the outer spring areas 59 relative to one another is effective. The difference between the displacements with respect to the individual spring windings 62 is the product of the maximum partial stroke of the area 56 of high spring stiffness and its spring diameter divided by the product of the medium reversing radius 6 and the winding number of the area 56 of high spring stiffness. In the shown example, this difference in the reversing area of the tension spring 53 is 0.08 mm; in the non-reversing area of the spring the difference caused by the reversal is zero.

The quotient of the medium reversing radius (6) and the differential stroke per spring winding is in the present embodiment 120, but in the non-reversing area, it is infinite. The minimum quotient may also be smaller, that is, it may also have a value of 50 without detrimentally affecting the life of the tension spring 53 even with a large number of actuations. The tension spring therefore may have a relatively small maximal length in spite of a large overall stroke.

Upon opening the drawer, the carrier element 41 is moved by the operating element from the rest position 2 to the park position 1. The piston rod 34 with the piston is moved in the process into the cylinder essentially without resistance. The tension spring 53 is tensioned in the process wherein the expansion of the spring in the area 57 of low spring stiffness is greater than the expansion of the area 56 of high spring stiffness. The area 56 of high spring stiffness moves around the reversing roller 71 and rotates the reversing roller 71 counterclockwise. By means of the transverse grooves or webs in the support surface 72, sliding of the tension spring 53 on the reversing roller 71 can be limited.

As the carrier element 41 reaches the park position 1, the carrier element is tilted by the curved section 24 of the guide tracks 22 whereby the operating element is released from the combined deceleration and acceleration device 10. The energy storage device 53 is then again charged. The drawer can now be completely opened.

The areas 56, 57 of different spring stiffness may also be distinguished by different thicknesses of the spring wire, by different materials, by the shape of the windings etc. For an adaptation, for example, to a different stroke or different force requirements, it is also possible to change for example the overall length of the spring, the length of the individual partial spring areas, the number and the diameter of the windings, the wire diameter, the reversing or redirecting radius etc.

What is claimed is:

1. A pull arrangement (51) with a tension spring (53) and a spring reversing structure (71) around which the tension spring at least partially extends, the arrangement including:

a tension spring (53) with an overall spring stroke of at least 50% of the nominal length (the length of the relaxed spring), the tension spring (53) having at least an area (56) of high spring stiffness and another area (57) of lower spring stiffness, the area (56) of high spring stiffness extending around the reversing structure (71) and in the area (56) of high spring stiffness, a quotient of the medium reversing or redirecting radius (6) and the differential stroke of the outer spring area (59) and the inner spring area (58) per spring winding (62) being greater than 50.

2. The pull arrangement (51) according to claim 1, wherein the area (56) of high spring stiffness provides for a partial stroke length which is maximally 30% of the overall stroke of the tensions spring.

3. The pull arrangement (51) according to claim 1, wherein the spring stiffness of the area (56) of high spring stiffness is at least three times the spring stiffness of the area (57) of low spring stiffness.

4. The pull arrangement (51) according to claim 1, wherein the tension spring (53) has the same wire thickness in both stiffness areas.

5. The pull arrangement (51) according to claim 1, wherein the outer diameter of the tension spring (53) is in the area (57) of the lower spring stiffness at least 1.5 times the outer diameter of the tension spring (53) in the area of the high spring stiffness.

6. The pull arrangement (51) according to claim 1, wherein the area (56) of high spring stiffness is at least twice as long as the area (57) of low spring stiffness.

7. The pull arrangement (51) according to claim 1, wherein the wrap-around angle of the tension spring (53) around the reversing device (71) is at least 90°.

8. A combined deceleration and acceleration structure (10) including a guide structure (21), a carrier element (41) supported so as to be movable along the guide structure (21) between a force-and-form-locked park position 1 and a rest position (2), the deceleration device (31) of the deceleration and acceleration structure comprising a pneumatic or hydraulic cylinder-piston unit (32) including a piston rod (34) which is connected to the carrier element (41) and the acceleration device (51) including an energy storage device (53) connected to the carrier element (41), the energy storage device (53) being charged in the park position of the carrier element (41), the energy storage device being in the form of a tension spring (53) which extends at least partially around a redirecting structure, the spring having an overall spring stroke of at least 50% of the nominal length (the length of the relaxed spring), the tension spring (53) having at least an area (56) of high stiffness and another area (57) of lower spring stiffness, the area (56) of high spring stiffness extending around the reversing structure (71) and in the area (56) of high spring stiffness, a quotient of the medium reversing or redirecting radius (6) and the differential stroke of the outer spring area (59) and the inner spring area (58) per spring winding (62) being greater than 50.

9. A guide system for a combined deceleration and acceleration arrangement (10) according to claim 8, wherein the piston cylinder structure 33 is disposed at one end of a housing (11) and its piston rod extend from the other end of the cylinder and is connected to the carrier element (41) which is movably supported by the guide structure (21) between a rest position adjacent the cylinder (33) and an extended position at the opposite end of the housing a reversing structure (71) arranged at the opposite end of the housing and a spring having one end connected to the carrier element (41) and extending around the revising structure (71) and back toward the cylinder (33) where the other end of the spring is connected to the housing (11) for moving the carrier element (41) toward the end position (2).

* * * * *